April 29, 1930.                    J. HANSON                    1,756,192
                    AIR PRESSURE APPARATUS FOR AUTOMOBILES
                       Filed May 10, 1927        2 Sheets-Sheet 1
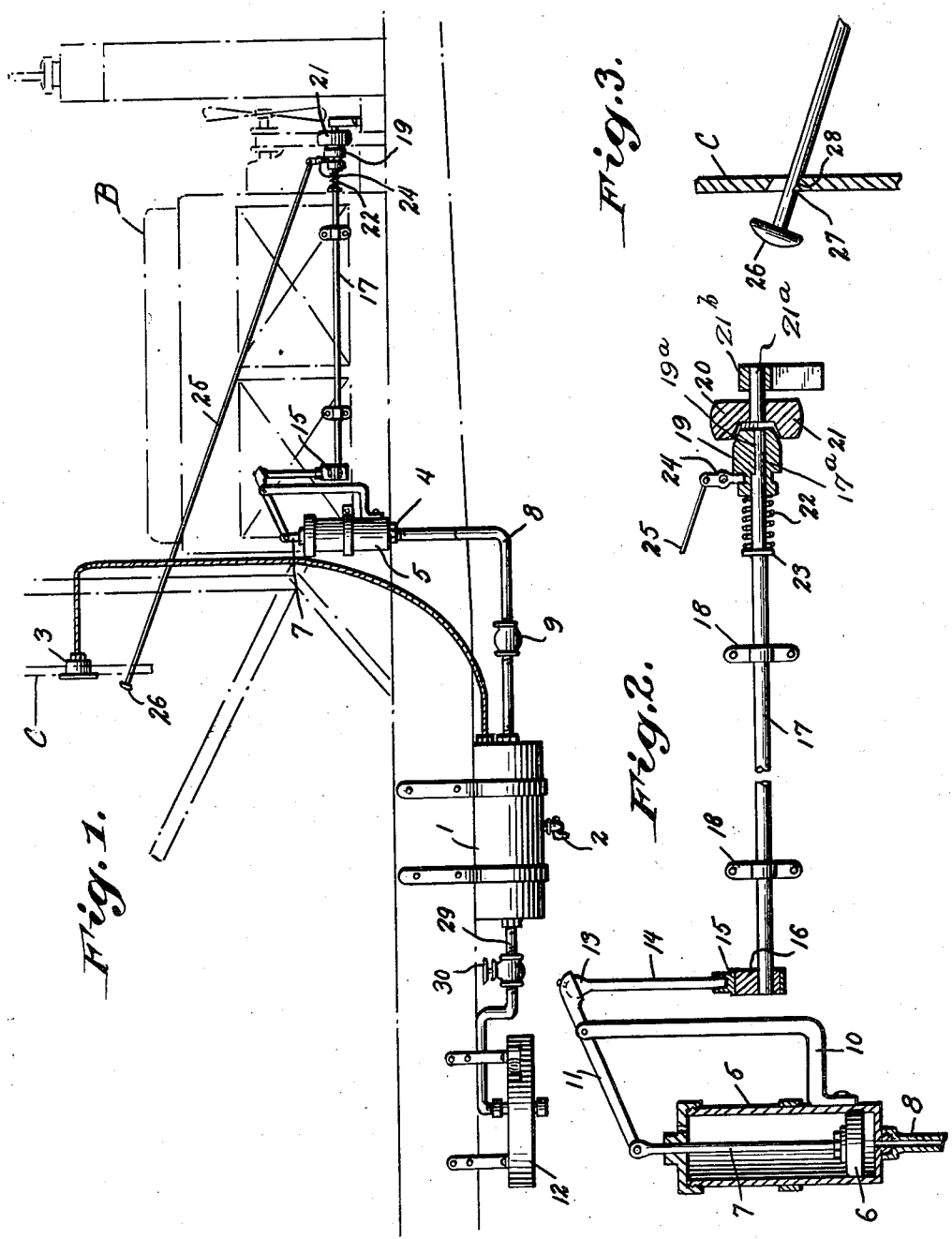
John Hanson. INVENTOR.
WITNESSES
BY Richard B. Owen.
                ATTORNEYS.

April 29, 1930.  J. HANSON  1,756,192
AIR PRESSURE APPARATUS FOR AUTOMOBILES
Filed May 10, 1927  2 Sheets-Sheet 2
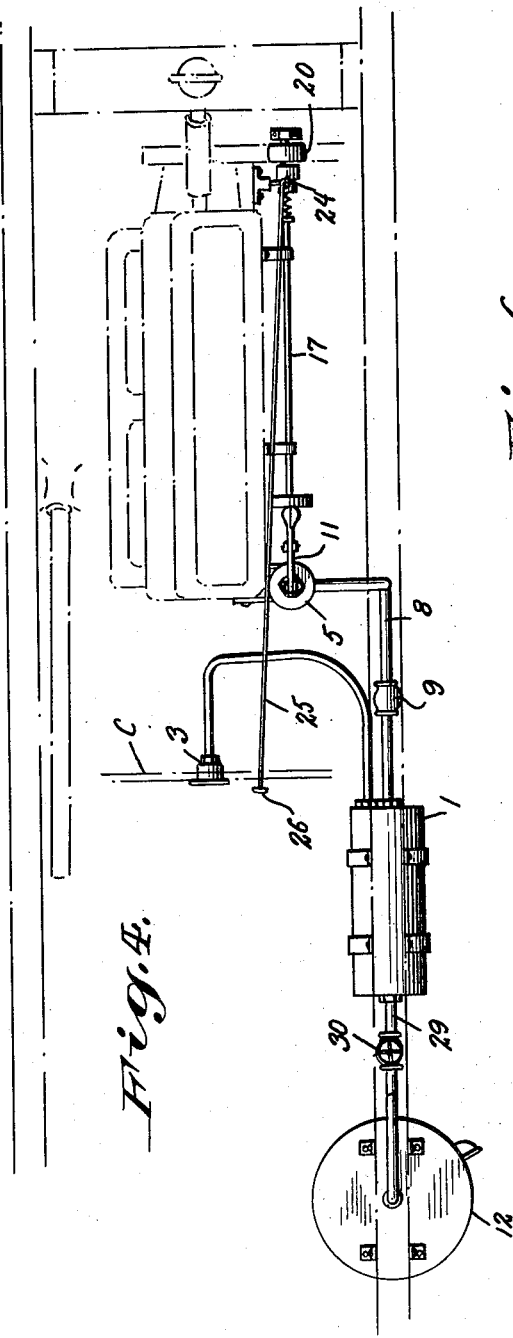
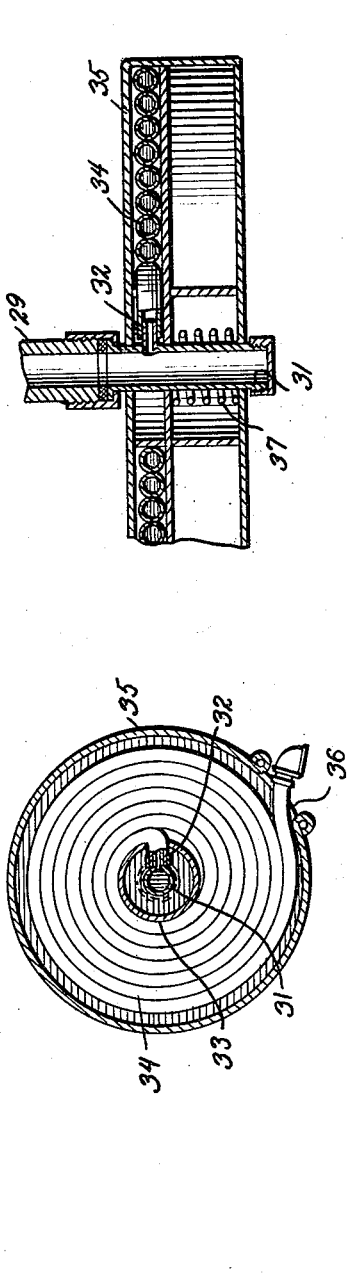
WITNESSES
John Hanson INVENTOR.
BY Richard B. Owen
ATTORNEYS.

Patented Apr. 29, 1930

1,756,192

UNITED STATES PATENT OFFICE

JOHN HANSON, OF PELICAN RAPIDS, MINNESOTA

AIR-PRESSURE APPARATUS FOR AUTOMOBILES

Application filed May 10, 1927. Serial No. 190,276.

This invention relates to an air pressure apparatus for automobiles, and has for its primary object the design of an apparatus that may be conveniently and permanently secured to an automobile frame to be operated by the motor, thereby enabling the automobile to generate its own air pressure for storage to conveniently inflate or increase the pressure of the tires of the automobile.

An object of the invention is to incorporate in an automobile the design and novel construction of air pressure apparatus that is capable of generating and storing air for use in the tires, including a coiled hose for this purpose which may be additionally used for cleaning purposes.

Another object of the invention is the novel construction of pump and the novel construction of drive mechanism therefor which may be driven from the fan belt of the motor by the simple operation of a control rod that extends to the instrument board of the automobile.

With these and other objects in view, my invention will be better understood from a description of the same when taken in connection with the accompanying drawings, wherein:—

Figure 1 is a diagrammatic view showing the application of my apparatus to an automobile;

Figure 2 is a longitudinal sectional view of the pump mechanism;

Figure 3 is a detail view of a portion of the control rod;

Figure 4 is a top plan view of the complete apparatus shown in applied position;

Figure 5 is a horizontal sectional view through the hose reel;

Figure 6 is a vertical sectional view through the hose reel.

Again referring to the drawings illustrating one of the many constructions of my in-invention, the numeral 1 designates an air reservoir including a safety valve 2 and a gauge 3. A pump 4 comprising cylinder 5, piston 6 and stem 7 is operatively connected by a novel form of mechanism with the automobile motor B so as to be conveniently operated from a point adjacent the front seat of the automobile. The cylinder 5 communicates with the air reservoir through the supply pipe 8 that includes the one way check valve 9. The piston 6 is of the valved reciprocating type.

Secured to the side of the cylinder is an arm 10 pivotally connected to a lever 11, that in turn has a pivotal connection with the stem, as indicated at 12, and further has a ball and socket connection 13 with a rod 14. This rod 14 is secured to an eccentric strap 15 associated with an eccentric disk 16 which is rigidly secured to the rear end of a drive shaft 17. The shaft 17 is supported from one side of the engine B in a horizontal position and with its front end arranged close to the fan belt of the engine. The shaft 10 is supported by bearings 18 which are secured to the engine B. The front end of the shaft 17 has associated therewith the male member 19 of a clutch 20. The female member 21 of the clutch 20 is in the form of a pulley which contacts with and is driven by the fan belt of the engine B, as clearly shown in Figure 1. The clutch member 21 is fixed to a stub shaft 21ª which has one end thereof journaled in a bearing 21ᵇ which is secured to the engine B in position to hold the clutch member in contact with the fan belt. The front end portion 17ª of the shaft 17 and the front portion of the bore 19ª of the clutch member 19 are of non-circular formation in order to establish a slidable and non-rotatable connection between the clutch member and shaft. The male member 19 is constantly urged toward the female member 21 by the spring 22 which abuts one end of the member 19 and a collar 23 carried by the drive shaft. A fork 24 is operatively associated with the member 19 and in turn is connected to a control rod 25 that extends to the instrument board C of the automobile so that the knob 26 thereof may be convenietly operated.

For the purpose of holding the control rod in position to hold the clutch normally out of engagement, the control rod is provided with a notch 27 engaged in a rib 28 carried by the instrument board, which has the advantage that the rod may be easily disengaged from the rib for allowing the spring to expand to close the clutch to immediately start the operation of the pump. A delivery pipe 29 including the control valve 30 has one end communicating with the air reservoir and its other end connected with a pipe section 31 to allow rotation of the latter. This pipe section 31 is provided with a laterally extending nipple 32, to which the inner convolution 33 of a coiled hose 34 is connected. This coiled hose 34 is confined within the casing 35 that is provided with an outlet 36 so that the hose may be drawn from the casing against the action of the coiled spring 37 which constantly acts to rotate the pipe section in the required direction to coil the hose about the pipe section in a position within the casing.

From the foregoing description taken in connection with the accompanying drawings, it will be appreciated that I provide a novel construction of apparatus that may be quickly and conveniently applied to an automobile frame and which may be operatively connected up with the motor according to the will of the operator. This result is efficiently accomplished by the arrangement of the pulley 21 in alignment with the pulley of the fan belt so that the same may be constantly driven, and by manipulation of the control rod the member 19 may be moved into operative engagement with member 20 so that the drive shaft may be rotated, which through its eccentric connection oscillates the lever 11 for giving the proper rectilinear movements to the piston 6. The air as compressed is forced through the check valve 9 to the air reservoir for storage. If it becomes necessary to utilize this stored air pressure, it is only necessary to draw the tube from the housing and connect to the tire or other device so that upon manipulation of the control valve 30 air may readily enter the tire.

It is, of course, to be understood that this source of air may be used for various other purposes than inflating tires, such as for blowing dust from the upholstery or to force grit or other foreign matter from certain parts. It is also to be understood that the design of the various parts entering into the combination and their relative arrangement may be changed in various manners than illustrated and, therefore, I do not desire to be limited in any manner except as set forth in the appended claim.

I claim:—

In an air pressure device for an automobile the combination of an air pump fixed to the automobile and including a piston and a stem extending upwardly from the piston, an arm extending upwardly from the pump, a lever pivoted between its ends to the upper end of the arm and pivotally connected at one end to the upper end of the stem, a shaft, bearings adapted to support the shaft in a horizontal position at one side of the engine of the automobile and with its front end close to the fan belt of the engine, an eccentric secured to the rear end of the shaft and a strap associated therewith, a rod secured to the eccentric strap and having a ball and socket connection with the other end of the lever, a stub shaft, a bearing adapted to be secured to the engine to rotatably support the stub shaft close to the fan belt, a pulley secured to the stub shaft for contact with the fan belt having a clutch face, the front end of said first shaft being of non-circular formation, a clutch member having a bore provided with a non-circular portion receiving said end of the shaft, a spring normally holding said second clutch member in engagement with said clutch face of the pulley, and means by which said clutch member may be withdrawn from engagement with said clutch face and held out of engagement therewith.

In testimony whereof I affix my signature.

JOHN HANSON.